(12) United States Patent
Son et al.

(10) Patent No.: US 12,366,254 B2
(45) Date of Patent: Jul. 22, 2025

(54) PUMP WITH SUCTION CHAMBER IMPACT BODY

(71) Applicant: LG ELECTRONICS INC., Seoul (KR)

(72) Inventors: Minsu Son, Seoul (KR); Seungjo Baek, Seoul (KR); Youjoon Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 439 days.

(21) Appl. No.: 17/802,226

(22) PCT Filed: Mar. 2, 2021

(86) PCT No.: PCT/KR2021/002545
§ 371 (c)(1),
(2) Date: Aug. 25, 2022

(87) PCT Pub. No.: WO2021/172967
PCT Pub. Date: Sep. 2, 2021

(65) Prior Publication Data
US 2023/0078088 A1    Mar. 16, 2023

(30) Foreign Application Priority Data
Feb. 28, 2020  (KR) .................... 10-2020-0025504

(51) Int. Cl.
  *F04D 29/42*   (2006.01)
  *B01D 19/00*   (2006.01)
  *F04D 7/04*    (2006.01)

(52) U.S. Cl.
CPC ..... *F04D 29/4293* (2013.01); *B01D 19/0073* (2013.01); *F04D 7/045* (2013.01); *F05D 2210/132* (2013.01)

(58) Field of Classification Search
CPC .... F04D 29/4293; F04D 7/045; F04D 29/426; F04D 29/708; B01D 19/0073; F05D 2210/132
See application file for complete search history.

(56) References Cited

U.S. PATENT DOCUMENTS 3,930,745 A    1/1976  Gassie
4,447,189 A *  5/1984  Jensen ................ F04D 29/00
                                          415/169.1

(Continued)

FOREIGN PATENT DOCUMENTS

EP    1024292     8/2000
EP    2253850    11/2010

(Continued)

OTHER PUBLICATIONS

Korean Office Action dated Aug. 16, 2024 issued in Application No. 10-2020-0025504.

(Continued)

*Primary Examiner* — Bryan M Lettman
(74) *Attorney, Agent, or Firm* — KED & ASSOCIATES, LLP

(57) ABSTRACT

A pump housing having a suction chamber and a discharge chamber. A partition wall dividing the suction chamber and the discharge chamber, and having a communication hole formed at a center thereof for allowing the suction chamber to communicate with the discharge chamber. An impact body disposed toward a suction part so as to come into contact with fluid introduced into the suction chamber through the suction passage; and a gas discharge part disposed at an upper portion of a circumferential surface of the housing and communicating with an outside so that gas, separated from the fluid in contact with the impact body, is discharged. The suction part extends in one direction perpendicular to a virtual center line passing through the (Continued)

housing, and the impact body is disposed in a direction opposite to an extending direction of the suction part with respect to the virtual center line.

15 Claims, 9 Drawing Sheets

(56) References Cited

U.S. PATENT DOCUMENTS

| | | | |
|---|---|---|---|
| 9,028,204 B2 | 5/2015 | Dossing | |
| 2006/0064954 A1 | 3/2006 | Yokota et al. | |
| 2008/0008578 A1* | 1/2008 | Dossing | F04D 9/003 |
| | | | 415/169.1 |
| 2011/0143311 A1 | 6/2011 | Thomas et al. | |

FOREIGN PATENT DOCUMENTS

| | | |
|---|---|---|
| KR | 10-2008-0045443 | 5/2008 |
| KR | 10-2013-0035238 | 4/2013 |
| KR | 10-2017-0048044 | 5/2017 |

OTHER PUBLICATIONS

International Search Report dated Jun. 17, 2021 issued in Application No. PCT/KR2021/002545.
Korean Notice of Allowance dated Apr. 10, 2025, issued in Application No. 10-2020-0025504.

* cited by examiner

PUMP WITH SUCTION CHAMBER IMPACT BODY

CROSS-REFERENCE TO RELATED PATENT APPLICATIONS

This application is a U.S. National Stage Application under 35 U.S.C. § 371 of PCT Application No. PCT/KR2021/002545, filed Mar. 2, 2021, which claims priority to Korean Patent Application No. 10-2020-0025504, filed Feb. 28, 2020, whose entire disclosures are hereby incorporated by reference.

TECHNICAL FIELD

The following description relates to a pump, and more particularly to a pump used in a circulation device to separate gas contained in a fluid.

BACKGROUND ART

A circulation pump includes a separate chamber in an upper space where an impeller is disposed. A fluid is introduced into the chamber and flows to the space where the impeller is disposed, such that the chamber may be provided with a separate component for gas separation.

This is to prevent blockage of a pump passage, which may be blocked by air when gas is contained in the fluid introduced into the pump and is continuously pumped.

Water introduced into the pump is a mixture of water and air. During operation of the pump, it is essential to separate water and air in order to prevent the pump passage from being blocked by the air.

U.S. Pat. No. 9,028,204B2 discloses a separate structure extending from top to bottom in a chamber. However, the structure interrupts the flow of a fluid introduced into a pump, thereby causing a problem of reducing a flow of fluid circulated by an impeller in the pump. That is, a wall structure disposed at the center of the chamber has a problem of continuously interrupting the inflow of water into the chamber, since water introduced into the chamber comes into contact with the wall structure, and then flows backward in the opposite direction.

DISCLOSURE OF INVENTION

Technical Problem

It is an object of the present disclosure to provide a pump capable of separating gas contained in water, without interrupting the inflow of water into a chamber.

It is another object of the present disclosure to provide a pump capable of allowing gas, separated in the chamber, to be smoothly discharged through a gas discharge part.

The objects of the present disclosure are not limited to the aforementioned objects and other objects not described herein will be clearly understood by those skilled in the art from the following description.

Technical Solution

In order to achieve the above objects, a pump according to the present disclosure includes: a housing having a suction chamber and a discharge chamber formed therein; a suction part extending outwardly from a circumferential surface of the housing, and having a suction passage formed therein through which a fluid is introduced into the suction chamber; a discharge part disposed under the suction part, extending from the circumferential surface of the housing in a direction opposite to the suction part, and having a discharge passage formed therein through which the fluid is discharged from the discharge chamber; a partition wall dividing the suction chamber and the discharge chamber, and having a communication hole formed at a center thereof for allowing the suction chamber to communicate with the discharge chamber; an impact body disposed toward the suction part so as to come into contact with the fluid introduced into the suction chamber through the suction passage; and a gas discharge part disposed at an upper portion of the circumferential surface of the housing and communicating with an outside so that gas, separated from the fluid in contact with the impact body, is discharged.

The suction part may extend in one direction perpendicular to a virtual center line passing through the housing, and the impact body may be disposed in a direction opposite to an extending direction of the suction part with respect to the virtual center line, such that the impact body may come into contact with the fluid, introduced from the suction part, without interrupting the flow of the fluid.

The impact body may include an impact surface disposed toward a suction part communication hole, through which the fluid flowing in the suction part is introduced into the suction chamber, a negative pressure surface which is a surface opposite to the impact surface, and a plurality of protrusions protruding from the impact surface toward the suction part.

The plurality of protrusions may extend in an up-down direction, and may protrude vertically from the impact surface, thereby increasing close friction contact with the fluid.

The impact body may protrude toward an inside of the suction chamber from the circumferential surface of the housing.

The impact body may extend from the partition wall to an upper surface of the housing, thereby contacting most of the fluid introduced from the suction part.

The impact body may include: a first impact body extending from the circumferential surface of the housing toward a center of the housing; and a second impact body bent from an end portion of the first impact body and extending in a direction in which the gas discharge part is disposed, thereby guiding the flow of the fluid.

The suction part communication hole allowing the suction chamber to communicate with the suction passage may be formed at one side of the housing, wherein the first impact body may be disposed toward the suction part communication hole, such that the gas separated by the impact body may flow to the gas discharge part.

The first impact body may have a first impact surface disposed toward the suction part communication hole; and the second impact body may have a second impact surface extending from the first impact surface and disposed toward a center of an inside of the housing.

Gas suction holes, formed in the gas discharge part to allow the suction chamber to communicate with an inside of the gas discharge part, may be disposed in a direction in which the second impact surface is directed with respect to a line extending from the second impact body, such that the gas separated by the impact body may flow to the gas suction holes.

An inclination angle formed between the second impact body and the first impact body may be an obtuse angle, such that the flow of the fluid may not be interrupted.

A gas discharge chamber, having a space to communicate with the suction chamber, may be formed in the gas discharge part.

The gas discharge part may protrude from one side of the circumferential surface of the housing in a direction in which the impact body is disposed.

The gas discharge part may include a gas discharge part end surface having a circular shape and disposed inside the suction chamber, and a gas discharge part circumferential surface vertically bent and extending from an edge of the gas discharge part end surface and formed by the gas discharge chamber having the space formed therein to communicate with the suction chamber.

The gas discharge part circumferential surface may include an inner gas discharge part circumferential surface disposed inside the suction chamber, and an outer gas discharge part circumferential surface disposed outside of the housing, wherein the gas suction holes allowing the suction chamber to communicate with the gas discharge chamber may be formed in the inner gas discharge part, such that the gas separated in the suction chamber may be discharged through the gas suction holes.

The gas suction holes may be provided in plurality, which are spaced apart at predetermined intervals in a centrifugal direction on the inner gas discharge part circumferential surface.

Other detailed matters of the embodiments are included in the detailed description and the drawings.

Advantageous Effects

The pump according to the present disclosure has one or more of the following effects.

First, an impact body is disposed in a chamber in a direction opposite to an extending direction of a suction part, thereby separating gas without interrupting the flow of a fluid.

Second, the impact body includes a first impact body and a second impact body bent and extending from the first impact body, in which the second impact body is disposed toward a gas discharge part to guide the separated gas to the gas discharge part, thereby effectively separating and discharging the gas.

Third, a plurality of protrusions, which protrude vertically, are disposed on an impact surface of the impact body, such that a contact surface with the fluid may increase, thereby increasing close friction contact with the fluid, and maximizing separation of the gas.

The effects of the present disclosure are not limited to the aforesaid, and other effects not described herein will be clearly understood by those skilled in the art from the following description of the appended claims.

MODE FOR INVENTION

Figure 1:
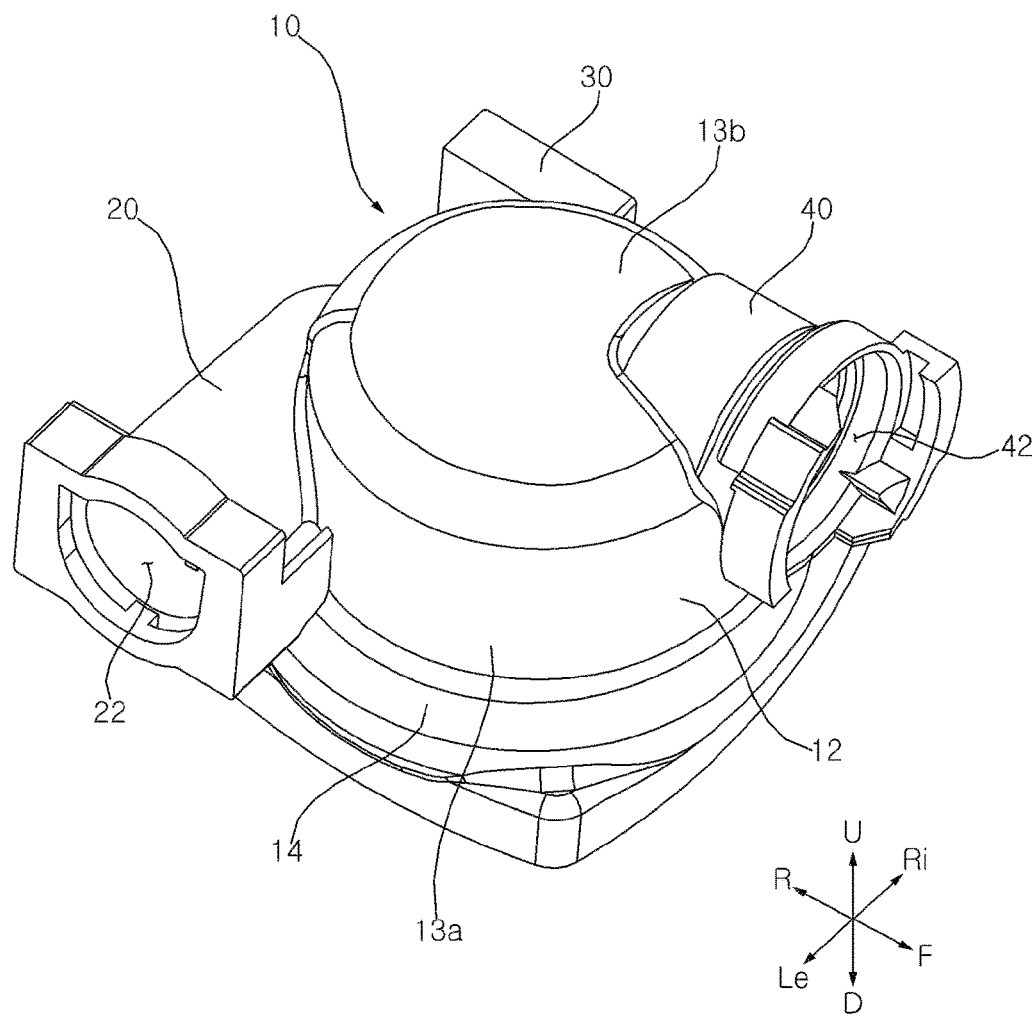
FIG. 1 is a perspective view of a pump according to an embodiment of the present disclosure.
Figure 2:
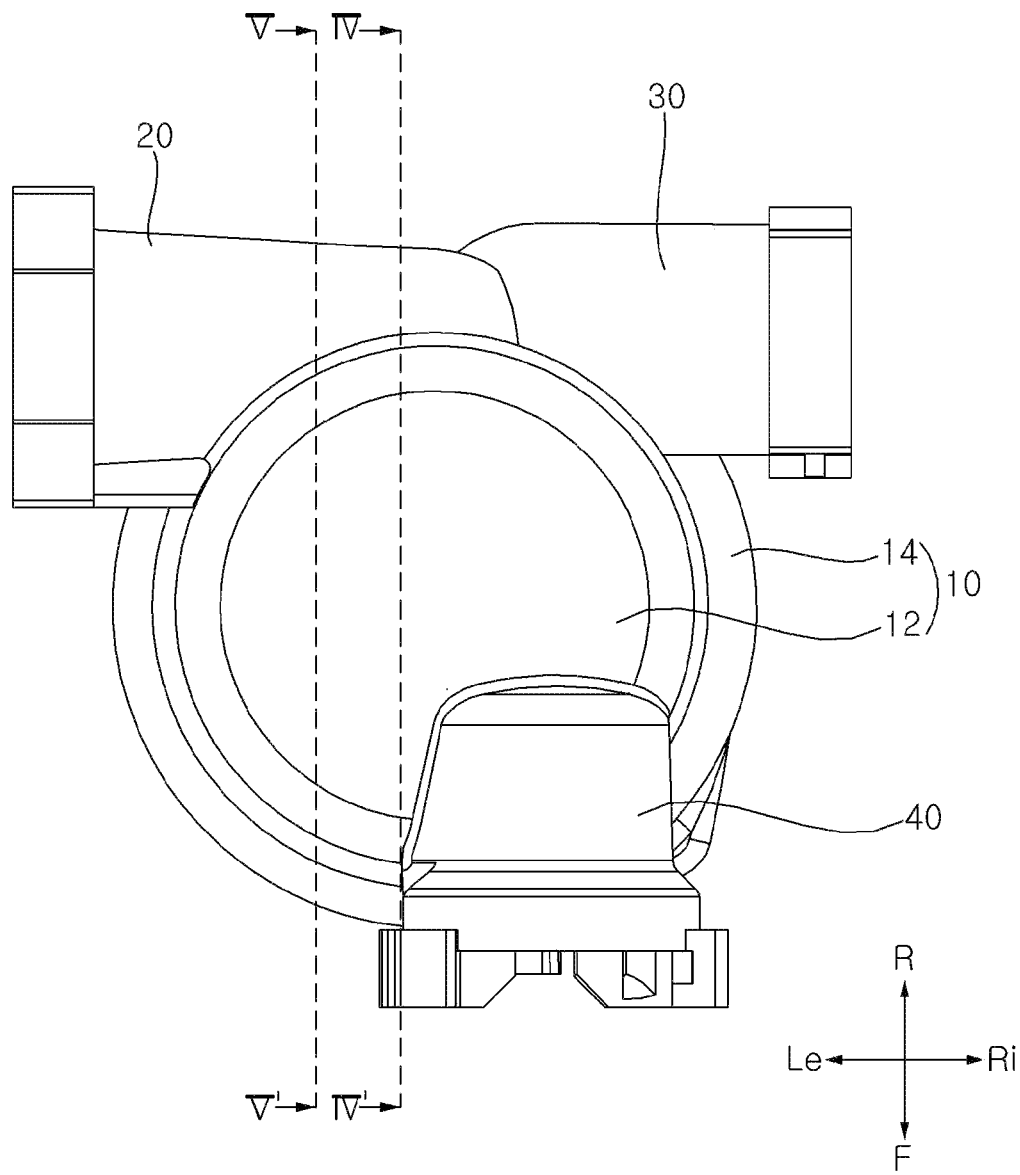
FIG. 2 is a plan view of a pump according to an embodiment of the present disclosure.
Figure 3:
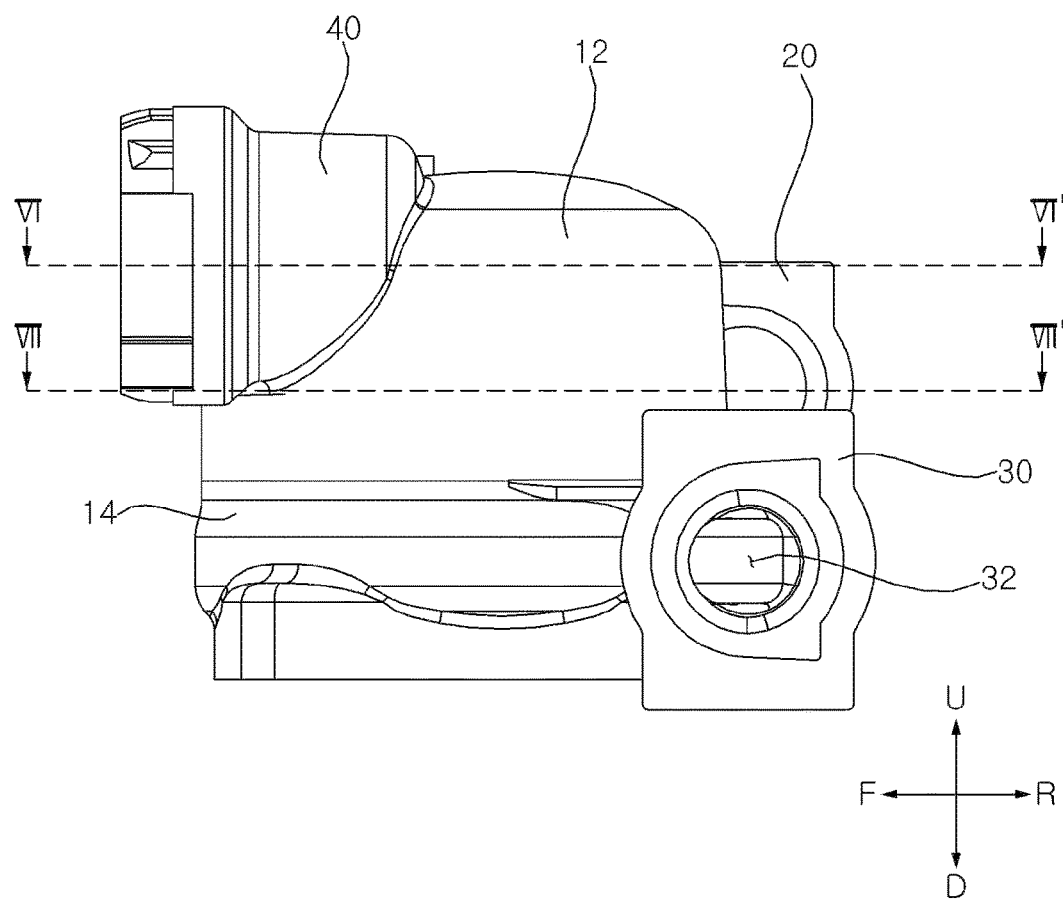
FIG. 3 is a side view of a pump according to an embodiment of the present disclosure.
Figure 4:
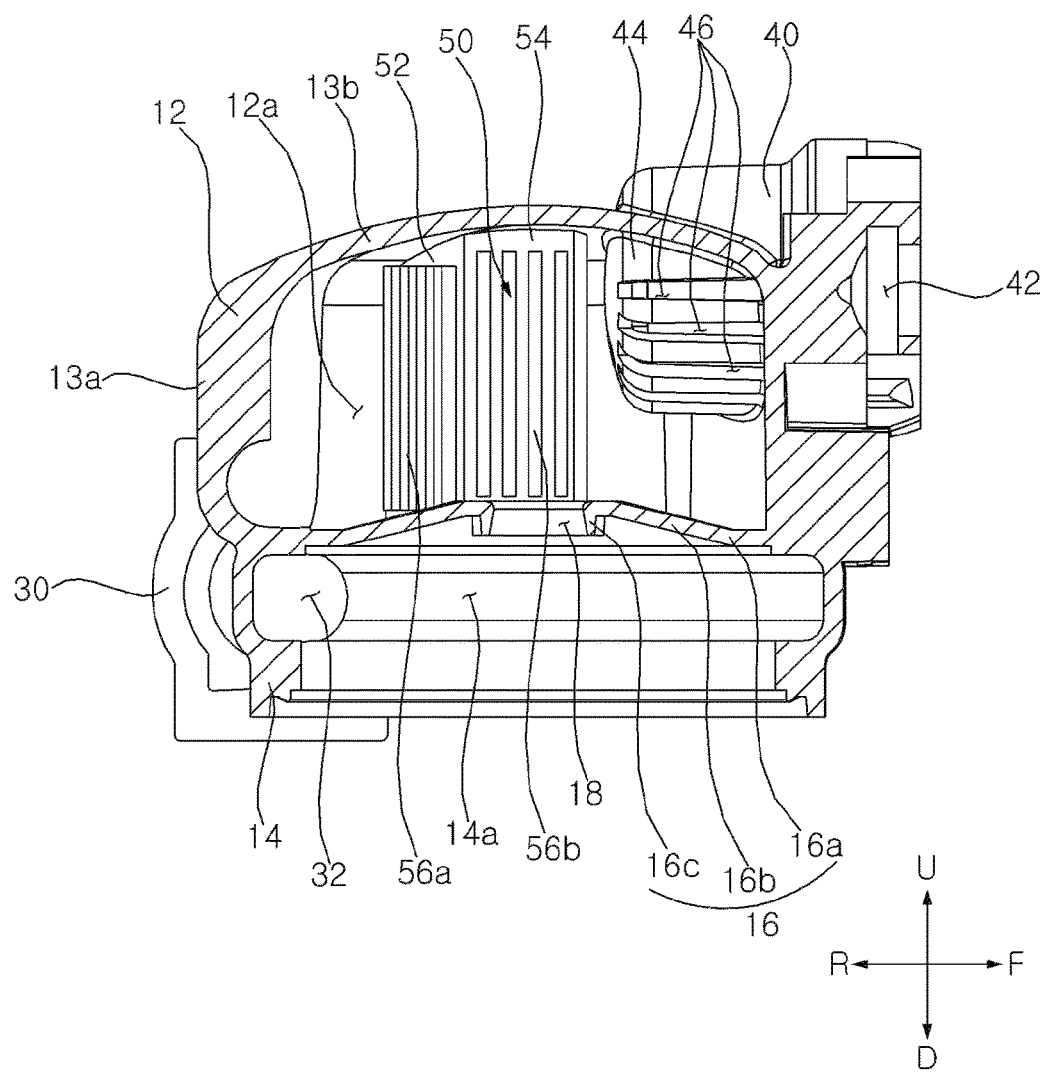
FIG. 4 is a cross-sectional view taken along line IV-IV' of FIG. 2.
Figure 5:
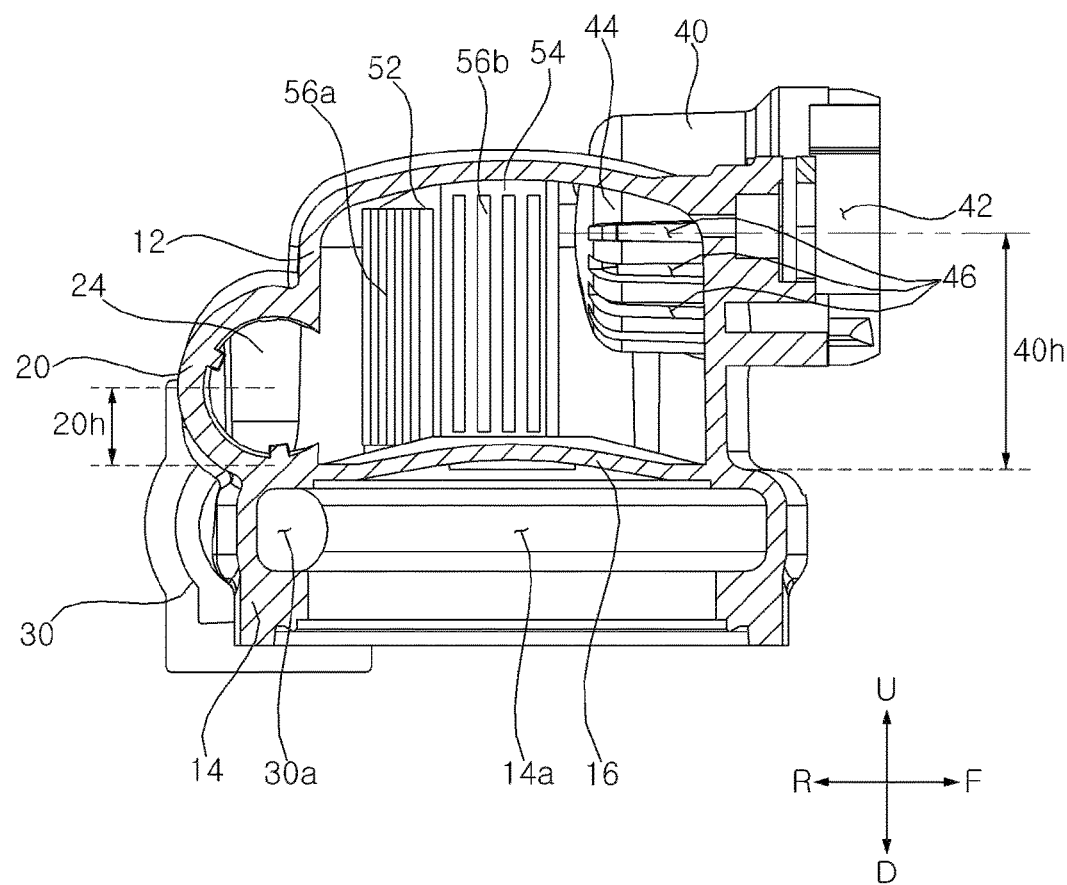
FIG. 5 is a cross-sectional view taken along line V-V' of FIG. 2.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

Directions, such as up (U), down (D), left (L), right (R), front (F), and rear (R), shown in FIGS. 1 to 9 are used for explaining the arrangement of elements of the present disclosure. Accordingly, the directions may vary according to a position used as a reference.

Hereinafter, a pump according to embodiments of the present disclosure will be described with reference to the accompanying drawings.

The pump includes: a housing 10 having a suction chamber 12a and a discharge chamber 14a formed therein; a suction part 20 extending outwardly from a circumferential surface of the housing 10, and having a suction passage formed therein through which a fluid is introduced into the suction chamber 12a; a discharge part 30 disposed under the suction part 20, extending from the circumferential surface of the housing 10 in a direction opposite to the suction part 20, and having a discharge passage (32) through which the fluid is discharged from the discharge chamber 14a; a partition wall 16 dividing the suction chamber 12a and the discharge chamber 14a, and having a communication hole 18 formed at a center thereof for allowing the suction chamber 12a to communicate with the discharge chamber 14a; an impact body 50 disposed so as to come into contact with the fluid introduced into the suction chamber 12a through the suction passage 24; and a gas discharge part 40 disposed at an upper portion of the circumferential surface of the housing 10 and communicating with an outside so that gas, separated from the fluid in contact with the impact body 50, may be discharged.

Although not illustrated in the drawing, an impeller (not shown), which rotates to cause the fluid in the housing 10 to flow, may be disposed in the discharge chamber 14a.

The housing 10 may include an upper housing 12 having the suction chamber 12a, and a lower housing 14a having the discharge chamber 14a. Referring to FIG. 1, the upper housing 12 and the lower housing 14 may be formed as one part. However, unlike the drawing, the upper housing 12 and the lower housing 14 may have a structure in which the upper housing 12 and the lower housing 14 are connected as separate parts.

The partition wall 16 may be formed between the upper housing 12 and the lower housing 14 to divide the suction chamber 12a and the discharge chamber 14a.

The upper housing 12 may have a cylindrical shape. The upper housing 12 includes a circumferential surface 13a extending in an up-down direction, and an upper surface 13b covering an upper side of the circumferential surface 13a, the surfaces 13a and 13b having the same radius. The suction part 20 is disposed at one side of the circumferential surface 13a of the upper housing 12. The upper surface 13b may have a dome shape that is convex upward.

Figure 7:
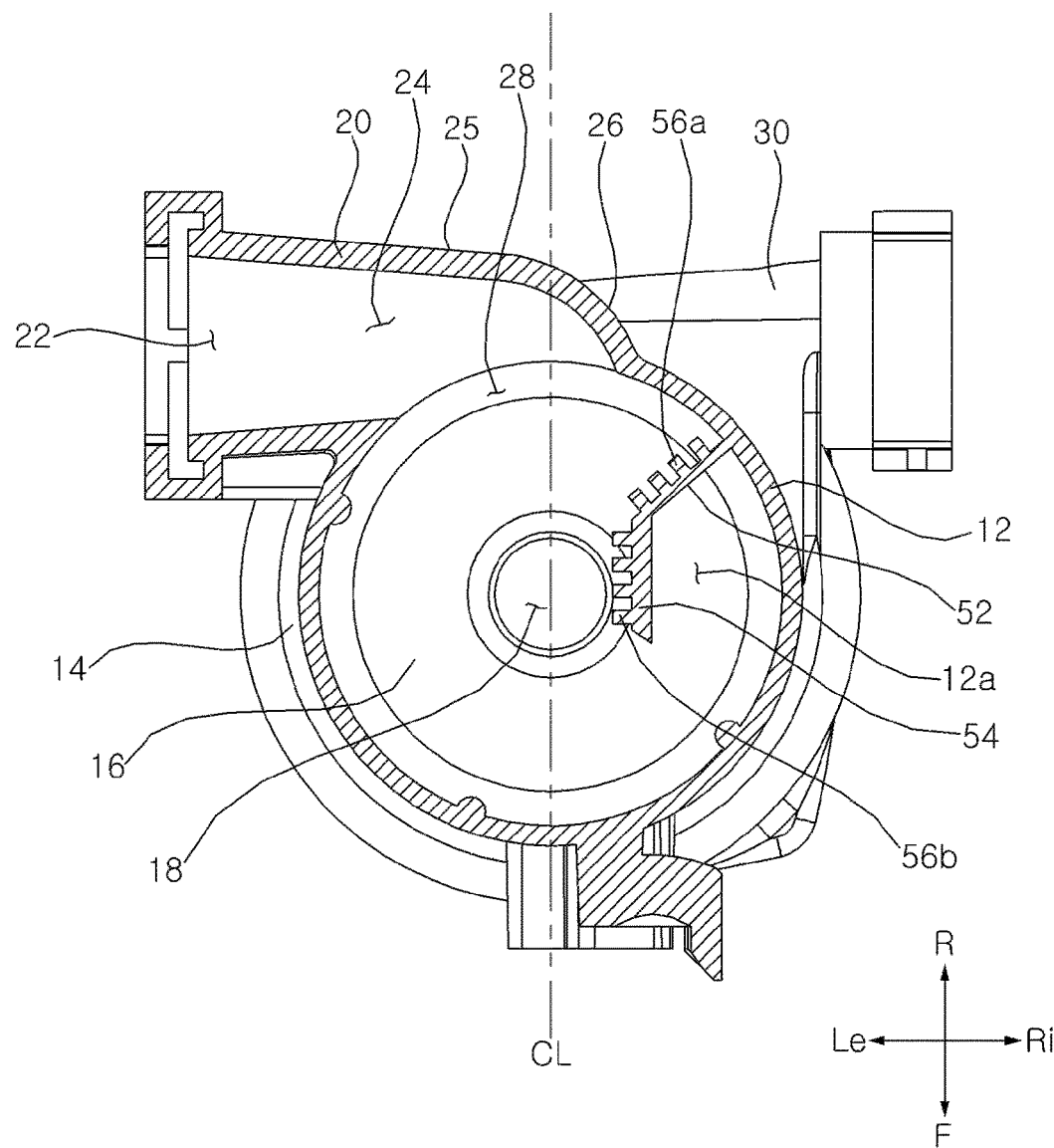
FIG. 7 is a cross-sectional view taken along line VII-VII' of FIG. 3.

The suction part 20 is connected to one side of the circumferential surface 13a of the upper housing 12. An inlet 22 communicating with the outside is formed at one end of the suction part 20, and the suction passage 24 is formed in a direction perpendicular to an opening surface of the inlet 22. The suction passage 24 formed in the suction part 20 may be formed at a portion, which is in contact with the circumferential surface 13a, in a direction approximately the same as a direction of a tangent line of the circumferential surface 13a. Referring to FIG. 7, the suction part 20 extends in one direction perpendicular to a virtual center line CL passing through the center of the housing 12. Referring to FIG. 7, the suction passage 24 formed in the suction part 20 is disposed on a left side of the circumferential surface 13a.

The suction part 20 includes: a suction part circumferential surface 25 having a cylindrical shape and having the suction passage formed therein; and a suction part end surface 26 disposed at an end portion of the suction part circumferential surface 25 and bent from the end portion of the suction part circumferential surface 25 to be connected to a suction part communication hole 28.

The suction part 20 contacts, on one side, the circumferential surface 13a of the upper housing 12. The suction part communication hole 28 for allowing the suction passage 24 to communicate with the suction chamber 12a is formed at a portion where the suction part 20 comes into contact with the circumferential surface 13a of the upper housing 12. The suction part communication hole 28 allows the suction passage 24 to communicate with the suction chamber 12a.

The lower housing 14 is disposed under the upper housing 12. The lower housing 14 has the discharge chamber 14a in which the impeller (not shown) is disposed. The partition wall 16 may be formed at an upper side of the lower housing 14, and a lower side of the lower housing 14 may be opened. A motor (not shown) for rotating the impeller may be disposed at the lower side of the lower housing 14.

A discharge part 30 for discharging the fluid in the discharge chamber 14a to the outside may be disposed on one side of the circumferential surface 13a of the lower housing 14. The discharge part 30 may extend in a rotating direction of the impeller. Referring to FIG. 7, the discharge part 30 is disposed under the suction part 20 and extends in a direction opposite to a direction in which the suction part 20 extends from the circumferential surface 13a of the housing 12. Referring to FIG. 7, the discharge part 30 extends rightward from the circumferential surface 13a of the housing 10.

The impeller is disposed at a lower side of the communication hole 18 and may have a structure for causing the fluid in the suction chamber 12a to move downward to flow in a radial direction.

The partition wall 16 for dividing the suction chamber 12a and the discharge chamber 14a is formed in the housing 10. The communication hole 18 having a circular shape is formed at the center of the partition wall 16. The communication hole 18 allows the suction chamber 12a to communicate with the discharge chamber 14a.

The partition wall 16 may have a shape which is inclined toward the suction chamber 12a in a direction from an outer end, which is in contact with the circumferential surface 13a of the upper housing 12, toward an inner end at which the communication hole 18 is formed. The partition wall 16 includes: an edge surface 16a extending from the outer end, which is in contact with the circumferential surface 13a of the upper housing 12, in a direction in which the communication hole 18 is formed; an inclined surface 16b extending from the inner end of the edge surface 16a toward the communication hole 18 and inclined toward the suction chamber 12a; and a discharge guide 16c bent from the inner end of the inclined surface 16b toward the discharge chamber 14a.

The edge surface 16a may form a surface perpendicular to the circumferential surface 13a of the upper housing 12. The inclined surface 16b may form a surface parallel to the edge surface 16a at an inner end which is in contact with the discharge guide 16c.

The discharge guide 16c may have the shape of a hollow cylinder. The communication hole 18 for allowing the suction chamber 12a to communicate with the discharge chamber 14a is formed in the discharge guide 16c. The discharge guide 16c may guide the fluid in the suction chamber 12a to flow to the discharge chamber 14a in which the impeller is disposed.

The gas discharge part 40 is disposed at one side of the circumferential surface 13a of the housing 10. The gas discharge part 400 may discharge gas, separated in the suction chamber 12a, to the outside. The gas discharge part 40 may be disposed on the circumferential surface 13a of the housing 10 and may be disposed at a higher position than the suction part 20. That is, a distance 40h, by which the center of the gas discharge part 40 is upwardly spaced apart from the partition wall 16, is greater than a distance 20h by which the center of the suction part 20 is upwardly spaced apart from the partition wall 16.

The gas discharge part 40 is formed at the upper housing 12 in a direction opposite to a portion of the upper housing 12 where the suction part 20 is formed. That is, referring to FIG. 6, the suction part 20 is disposed at the rear of the circumferential surface 13a of the housing 10, and the gas discharge part 40 is disposed at the front of the circumferential surface 13a of the housing 10.

A gas discharge chamber 42 forming a space for communication with the suction chamber 12a is formed in the gas discharge part 40. The gas discharge part 40 has the gas discharge chamber 42 formed inside and outside of the housing 10.

Figure 6:
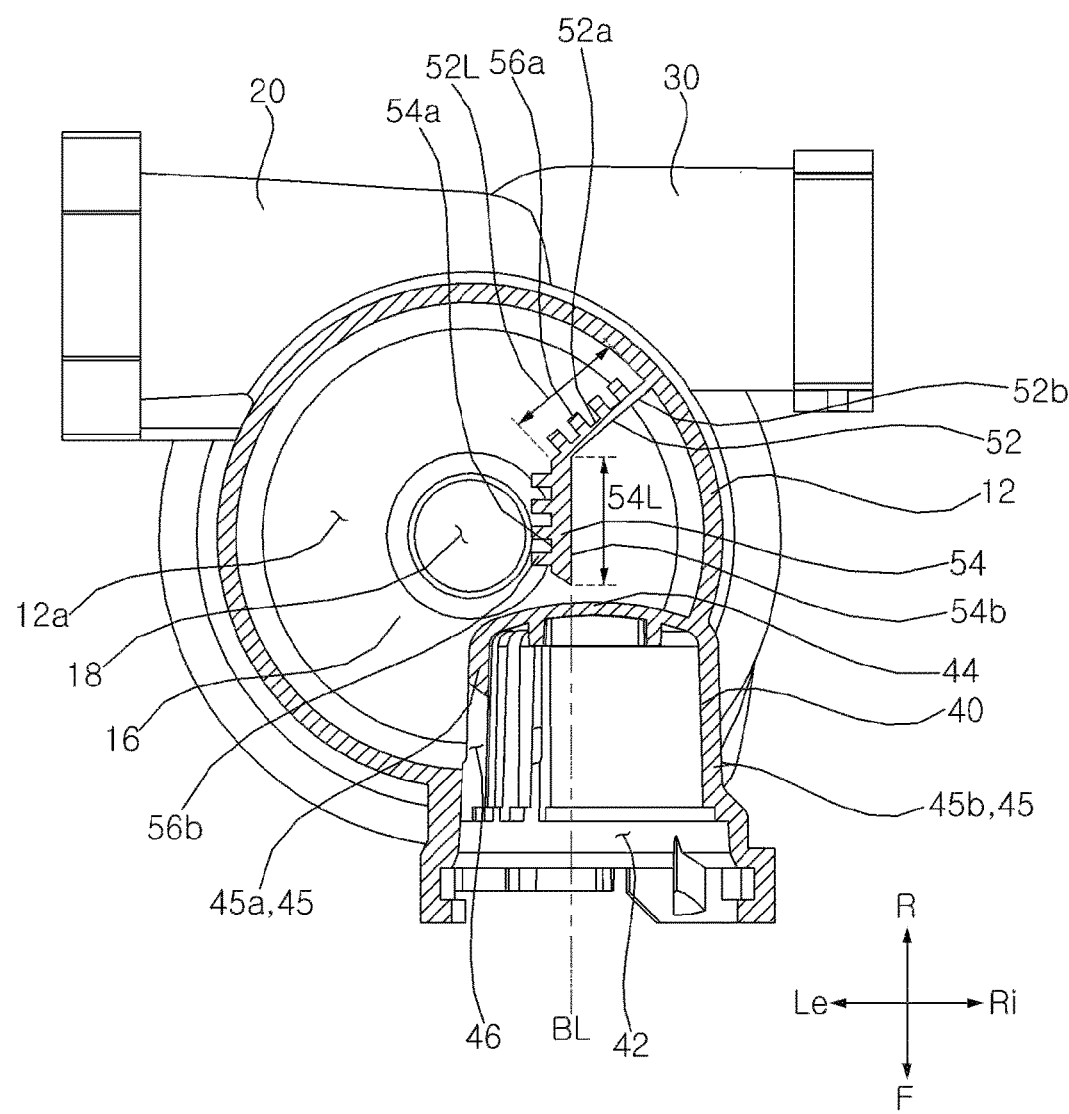
FIG. 6 is a cross-sectional view taken along line VI-VI' of FIG. 3.

The gas discharge part 40 may protrude from the inside of the suction chamber 12a toward the impact body 50. The gas discharge part 40 may have a cylindrical shape with an internal space formed therein. The gas discharge part 40 may have a cylindrical shape which is formed in a front-rear direction at an upper portion of the circumferential surface 13a of the housing 10. Referring to FIG. 6, the gas discharge part 40 is biased rightward in the suction chamber 12a. The gas discharge part 40 is biased in a direction opposite to the direction in which the suction part 20 extends from the housing 10.

The gas discharge part 40 includes: a gas discharge part end surface 44 having an approximately circular shape and disposed in the suction chamber 12a; and a gas discharge part circumferential surface 45 vertically bent and extending from an edge of the gas discharge part end surface 44 and having a cylindrical shape. The gas discharge part circumferential surface 45 includes: an inner gas discharge part circumferential surface 45a disposed inside the suction chamber 12a; and an outer gas discharge part circumferential surface 45b disposed outside of the housing 10.

The gas discharge part end surface 44 may form a surface approximately perpendicular to a second impact body 54 which will be described later. The gas discharge part end surface 44 may form a surface which is convexly curved toward the second impact body 54.

The gas discharge part 40 includes: an inner gas discharge part 40 protruding from the circumferential surface 13a of the upper housing 12 toward the suction chamber 12a; and an outer gas discharge part 40 protruding outward from the circumferential surface 13a of the upper housing 12.

The inner gas discharge part 40 may include the gas discharge part end surface 44 and the inner gas discharge part circumferential surface 45a.

Gas suction holes 46 for allowing the suction chamber 12a to communicate with the gas discharge chamber 42 are formed in the inner gas discharge part 40. Gas separated by colliding with the impact body 50 in the suction chamber 12a may flow to the gas discharge chamber 52 through the gas suction holes 46.

A plurality of gas suction holes 46 may be formed which are spaced apart at predetermined intervals in a centrifugal direction on the inner gas discharge part circumferential surface 45a. The gas suction holes 46 may extend to the gas discharge part end surface 44. The gas suction holes 46 may be formed at the left side with respect to a virtual line BL extending from the second impact body 54 to be described later.

The outer gas discharge part 40 protrudes radially outwardly from the circumferential surface 13a of the upper housing 12. A separate structure for discharging gas, discharged from the suction chamber 12a, to the outside may be connected to an end portion of the outer gas discharge part 40.

The impact body 50 may be disposed toward the suction part communication hole 28 of the suction part 20 so that the fluid introduced from the suction part 20 into the suction chamber 12a may collide with the impact body 50. Referring to FIG. 7, the impact body 50 is disposed in a direction opposite to the extending direction of the suction part 20, with respect to a virtual line CL passing through the center of the housing 12.

The impact body 50 extends approximately vertically upward from the partition wall 16 to the upper surface 13b of the housing 10. The impact body 50 extends from the circumferential surface 13a of the housing 10 toward the inside of the suction chamber 12a.

The impact body 50 includes: impact surfaces 52a and 54a disposed toward the suction part communication hole 28 of the suction part 20; and negative pressure surfaces 52b and 54b which are surfaces opposite to the impact surfaces 52a and 54a. A plurality of protrusions 56a and 56b, protruding toward the suction part 20 and extending in the up-down direction, are formed on the impact surfaces 52a and 54a of the impact body 50. The plurality of protrusions 56a and 56b have a comb shape and extend in the up-down direction. The plurality of protrusions 56a and 56b may increase friction of the fluid coming into contact with the impact body 50, thereby separating gas contained in the fluid. The impact body 50 is disposed between the suction part 20 and the gas discharge part 40. The fluid flowing from the suction part 20 to the suction chamber 12a comes into contact with the impact body 50, such that gas may be separated therefrom. The impact body 50 may separate the gas, contained in the fluid flowing in the suction part 20, and may guide the gas to flow to the gas discharge part 40.

The impact body 50 includes: a first impact body 52 protruding from the circumferential surface 13a of the housing 10 toward the inside of the suction chamber 12a; and a second impact body 54 forming an inclination angle with the first impact body 52 at an end portion of the first impact body 52 and extending in a direction in which the gas discharge part 40 is disposed.

The first impact body 52 is disposed toward the suction part communication hole 28. The first impact body 52 includes: a first impact surface 52a disposed toward the suction part communication hole 28; and a first negative pressure surface 52b which is a surface opposite to the first impact surface 52a.

The first impact surface 52a may be disposed toward the suction part communication hole 28. Accordingly, the fluid flowing to the suction chamber 12a through the suction part communication hole 28 collides with the first impact surface 52a. The first impact body 52 extends from the circumferential surface 13a of the housing 10 toward the center of the housing 10. A plurality of first protrusions 56a, protruding toward the suction part 20, are formed on the first impact surface 52a of the first impact body 52. The plurality of first protrusions 56a are formed perpendicular to the first impact surface 52a and extend in the up-down direction.

A length 52L of the first impact body 52, which extends inward from the circumferential surface 13a of the housing 10, may be equal to a length 54L of the second impact body 54 which extends from the end portion of the first impact body 52.

The second impact body 54 is bent from the end portion of the first impact body 52 to extend toward the gas discharge part 40. The second impact body 54 comes into contact with the fluid flowing in the suction chamber 12a through the suction part 20. The second impact body 54 guides the fluid, flowing in the suction chamber 12a, toward the gas discharge part 40.

The second impact body 54 is formed in a front-rear direction in the suction chamber 12a. The second impact body 54 extends upward from the partition wall 16 toward the upper surface 13b of the housing 10. The second impact body 54 is disposed toward the center of the inside of the housing 10. An inclination angle formed between the second impact body 54 and the first impact body 52 is an obtuse angle.

The second impact body 54 includes: a second impact surface 54a extending from the first impact surface 52a of the first impact body 52 and disposed toward the center of the inside of the housing 10; and a second negative pressure surface 54b which is a surface opposite to the second impact surface 54a.

A virtual line extending in the front-rear direction from the second impact body 54 passes through the gas discharge part 40. The gas suction holes 46 of the gas discharge part 40 are formed on the left side with respect to the virtual line extending in the front-rear direction from the second impact body 54. That is, the gas suction holes 46 formed in the gas discharge part 40 are disposed in a direction in which the second impact surface 54a is directed, with respect to the second impact body 54. Referring to FIG. 6, the second impact body 54 is positioned rightward relative to the gas suction holes 46 formed in the gas discharge part 40.

The second impact surface 54a is disposed toward the center of the housing 10. The second impact body 54 extends from the end portion of the first impact body 52 toward the gas discharge part 40. That is, the fluid, contacting the first impact body 52 and flowing to the second impact body 54, may flow toward the gas discharge part 40 via the second impact body 54.

A plurality of second protrusions 56b, protruding toward the center of the housing 10, are formed on the second impact surface 54a. The plurality of second protrusions 56b are formed perpendicular to the first impact surface 52a and extend in the up-down direction.

In this structure, the fluid flowing into the suction chamber 12a along the suction passage 24, comes into contact with the impact body 50. The fluid introduced into the suction chamber 12a along the suction passage 24 collides with the impact body 50, such that the gas contained in the fluid may be separated.

Particularly, the fluid introduced into the suction chamber 12a along the suction passage 24, sequentially comes into contact with the first impact body 52 and the second impact body 54. In this case, the gas contained in the fluid may be separated effectively by the plurality of protrusions 56a and 56b formed on the first impact body 52 and the second impact body 54.

By the rotation of the impeller (not shown) disposed in the discharge chamber 14a, the fluid in the suction chamber 12a flows into the communication hole 18 formed in the center of the partition wall 16. However, the gas, separated by colliding with the impact body 50, moves upward due to buoyancy to flow to the gas suction holes 46 formed in the gas discharge part 40 to be discharged to the outside.

Second Embodiment

Figure 8:
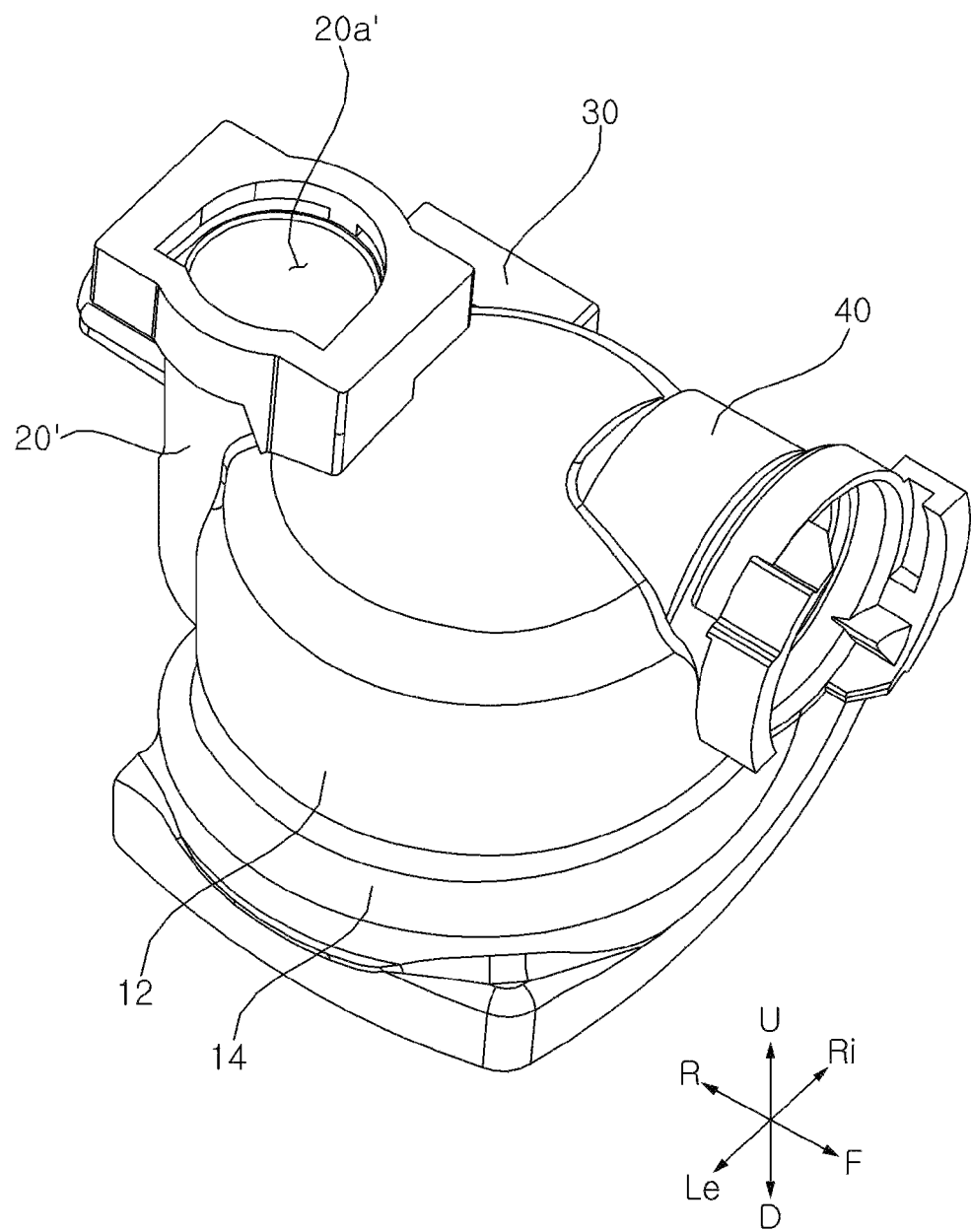
FIG. 8 is a view of a pump according to another embodiment of the present disclosure.
Figure 9:
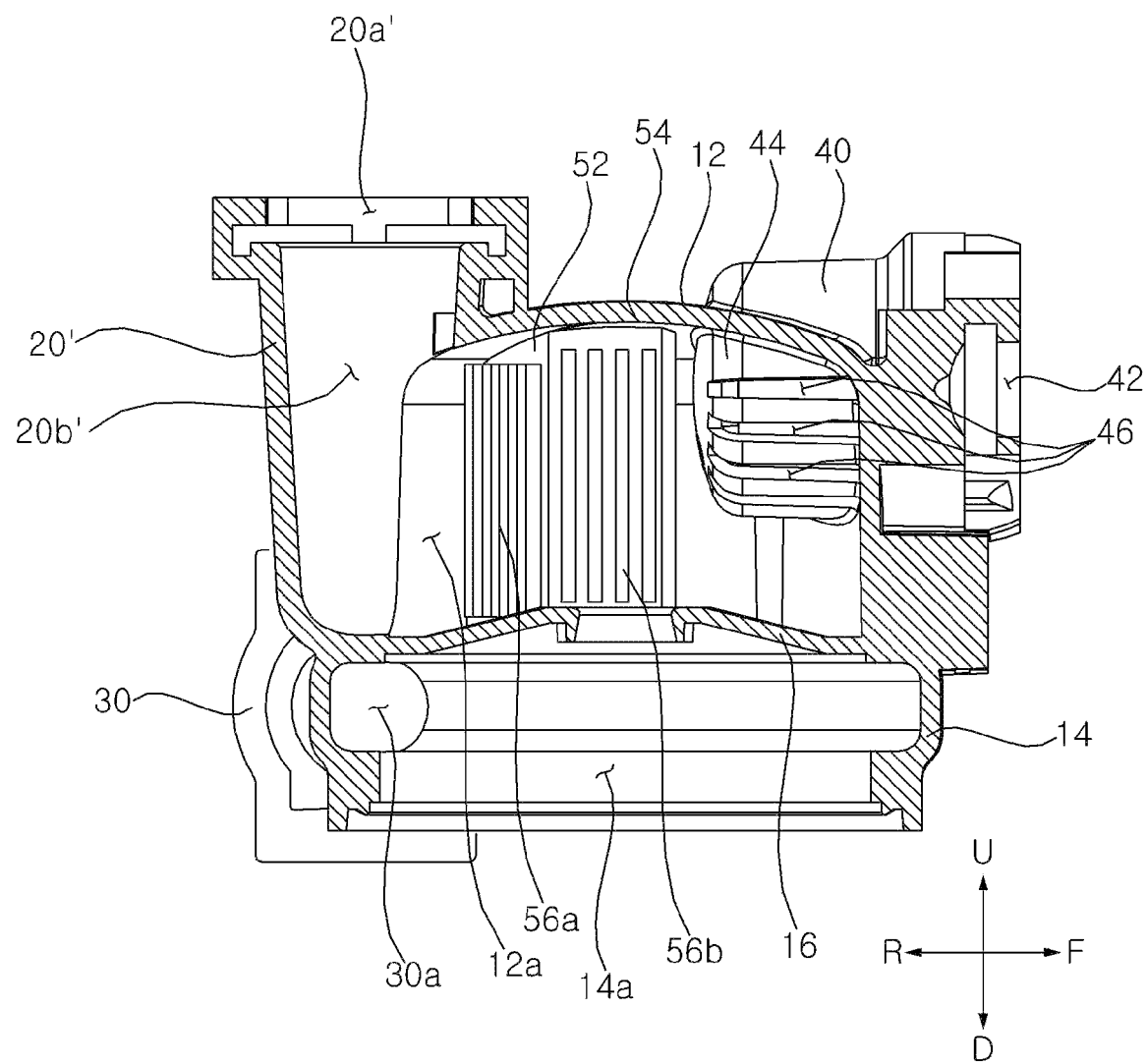
FIG. 9 is a side cross-sectional view of FIG. 8.

Hereinafter, a pump according to another embodiment will be described with reference to FIGS. 8 and 9. The pump described with reference to FIGS. 8 and 9 will be described based on a suction part 20' which is different from the pump described with reference to FIGS. 1 to 7.

The suction part 20' is connected to one side of the circumferential surface 13a of the upper housing 12 and may have a structure in which the suction part 20' extends upward from the circumferential surface 13a. A suction passage 20b' formed in the suction part 20' may be disposed perpendicular to a discharge passage (30a) formed toward the inside of the discharge part 30.

The fluid flowing through the suction passage 20b' comes into contact with the partition wall 16 to be introduced into the suction chamber 12a. In this case, gas may be primarily separated from the fluid flowing through the suction passage 20b' by the partition wall.

In addition, a portion of the fluid introduced into the suction chamber 12a may collide with the impact body 50 disposed perpendicular to the partition wall 16, such that gas may be secondarily separated. The separated gas may flow due to buoyancy to the gas discharge part 40 formed at an upper portion of the upper housing 12.

While the present disclosure has been particularly shown and described with reference to preferred embodiments thereof, it will be understood by those skilled in the art that the present disclosure is not limited to those exemplary embodiments and various changes may be made therein without departing from the scope and spirit of the invention as defined by the appended claims and should not be individually understood from the technical spirit or prospect of the present disclosure.

The invention claimed is:

1. A pump comprising:
a housing having a suction chamber and a discharge chamber formed therein;
a suction part extending outwardly from a circumferential surface of the housing, and having a suction passage formed therein through which a fluid is introduced into the suction chamber;
a discharge part disposed under the suction part, extending from the circumferential surface of the housing in a direction opposite to the suction part, and having a discharge passage formed therein through which the fluid is discharged from the discharge chamber;
a partition wall dividing the suction chamber and the discharge chamber, and having a communication hole formed at a center thereof for allowing the suction chamber to communicate with the discharge chamber;
an impact body disposed toward the suction part so as to come into contact with the fluid introduced into the suction chamber through the suction passage; and
a gas discharge part disposed at an upper portion of the circumferential surface of the housing and communicating with an outside so that gas, separated from the fluid in contact with the impact body, is discharged,
wherein the suction part extends in one direction perpendicular to a virtual center line passing through the housing, and the impact body is disposed in a direction opposite to an extending direction of the suction part with respect to the virtual center line.

2. The pump of claim 1, wherein the impact body comprises an impact surface disposed toward a suction part communication hole, through which the fluid flowing in the suction part is introduced into the suction chamber, a negative pressure surface which is a surface opposite to the impact surface, and a plurality of protrusions protruding from the impact surface toward the suction part.

3. The pump of claim 2, wherein the plurality of protrusions extend in an up-down direction parallel to an axial direction of the circumferential surface, and protrude vertically from the impact surface.

4. The pump of claim 1, wherein the impact body protrudes toward an inside of the suction chamber from the circumferential surface of the housing.

5. The pump of claim 1, wherein the impact body extends from the partition wall to an upper surface of the housing.

6. The pump of claim 1, wherein the impact body comprises:
a first impact body extending from the circumferential surface of the housing toward a center of the housing; and
a second impact body bent from an end portion of the first impact body and extending in a direction in which the gas discharge part is disposed.

7. The pump of claim 6, wherein the suction part communication hole allowing the suction chamber to communicate with the suction passage is formed at one side of the housing,
wherein the first impact body is disposed toward the suction part communication hole.

8. The pump of claim 6, wherein:
the first impact body has a first impact surface disposed toward the suction part communication hole; and
the second impact body has a second impact surface extending from the first impact surface and disposed toward a center of an inside of the housing.

9. The pump of claim 8, wherein gas suction holes, formed in the gas discharge part to allow the suction chamber to communicate with an inside of the gas discharge part, are disposed in a direction in which the second impact surface is directed with respect to the second impact body.

10. The pump of claim 6, wherein an inclination angle formed between the second impact body and the first impact body is an obtuse angle.

11. The pump of claim 1, wherein a gas discharge chamber, having a space to communicate with the suction chamber, is formed in the gas discharge part.

12. The pump of claim 11, wherein the gas discharge part protrudes from one side of the circumferential surface of the housing in a direction in which the impact body is disposed.

13. The pump of claim 1, wherein the gas discharge part comprises a gas discharge part end surface having a circular shape and disposed inside the suction chamber, and a gas discharge part circumferential surface vertically bent and extending from an edge of the gas discharge part end surface and formed by the gas discharge chamber having the space formed therein to communicate with the suction chamber.

14. The pump of claim 13, wherein the gas discharge part circumferential surface comprises an inner gas discharge part circumferential surface disposed inside the suction chamber, and an outer gas discharge part circumferential surface disposed outside of the housing,
   wherein gas suction holes allowing the suction chamber to communicate with the gas discharge chamber are formed in the inner gas discharge part.

15. The pump of claim 14, wherein the gas suction holes are provided in plurality, which are spaced apart at predetermined intervals in a centrifugal direction on the inner gas discharge part circumferential surface.

\* \* \* \* \*